US008250175B2

(12) United States Patent
Ma

(10) Patent No.: US 8,250,175 B2
(45) Date of Patent: Aug. 21, 2012

(54) TECHNIQUES FOR REMAPPING CONTENT REQUESTS

(75) Inventor: Kevin Ma, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 1088 days.

(21) Appl. No.: 11/497,823

(22) Filed: Aug. 2, 2006

(65) Prior Publication Data

US 2008/0040306 A1 Feb. 14, 2008

(51) Int. Cl.
*G06F 15/16* (2006.01)
(52) U.S. Cl. .......... 709/218; 709/219; 709/238
(58) Field of Classification Search .......... 709/223–224, 709/238, 218–219
See application file for complete search history.

(56) References Cited

U.S. PATENT DOCUMENTS

| | | | | |
|---|---|---|---|---|
| 6,532,493 B1* | 3/2003 | Aviani et al. | ............... | 709/224 |
| 6,560,717 B1* | 5/2003 | Scott et al. | ............... | 714/4 |
| 6,606,643 B1* | 8/2003 | Emens et al. | ............... | 709/203 |
| 6,628,654 B1 | 9/2003 | Albert et al. | | |
| 6,687,732 B1* | 2/2004 | Bector et al. | ............... | 709/200 |
| 6,779,017 B1* | 8/2004 | Lamberton et al. | ............... | 709/203 |
| 6,968,389 B1 | 11/2005 | Menditto et al. | | |
| 6,981,029 B1 | 12/2005 | Menditto et al. | | |
| 7,472,178 B2* | 12/2008 | Lisiecki et al. | ............... | 709/223 |
| 7,493,389 B2* | 2/2009 | Aviani et al. | ............... | 709/224 |
| 7,580,349 B1* | 8/2009 | Wang et al. | ............... | 370/230 |
| 2003/0079027 A1* | 4/2003 | Slocombe et al. | ............... | 709/229 |
| 2003/0081595 A1* | 5/2003 | Nomura et al. | ............... | 370/353 |
| 2003/0225859 A1* | 12/2003 | Radia et al. | ............... | 709/219 |
| 2004/0088408 A1* | 5/2004 | Tsyganskiy | ............... | 709/225 |
| 2004/0117493 A1* | 6/2004 | Bazot et al. | ............... | 709/229 |
| 2005/0063411 A1 | 3/2005 | Wang et al. | | |
| 2005/0076339 A1 | 4/2005 | Merrill et al. | | |
| 2005/0264567 A1* | 12/2005 | Sommers | ............... | 345/423 |
| 2006/0036761 A1* | 2/2006 | Amra et al. | ............... | 709/238 |
| 2006/0112170 A1* | 5/2006 | Sirkin | ............... | 709/217 |
| 2007/0016937 A1* | 1/2007 | Bassett et al. | ............... | 726/1 |

(Continued)

OTHER PUBLICATIONS

E. Rosen, "Multiprotocol Label Switching Architecture", Networking Working Group, Cisco Systems, Inc., 57 pages, Jan. 2001.

(Continued)

*Primary Examiner* — David Lazaro
(74) *Attorney, Agent, or Firm* — Fish & Richardson P.C.

(57) ABSTRACT

Techniques for routing content requests are provided. In one embodiment, a first device at a network device sends a request from a first device at a first site for content to a second device at a second site. The second device determines if the request should be redirected to a third device in a third site. For example, a content server in the second site may decide that a request is better serviced by a third site. This may be because the third site may be closer to the first site, the second site may be overloaded or down, etc. If the request should be redirected, the second device determines a rule for sending further requests for the content to the third site. Signaling is then sent to the network device such that the rule may be installed where further requests for the content are sent to the third site. The further requests are sent to the third site without going through the second site. Accordingly, the requests are more efficiently routed to the third site instead of having to go through the second site and being redirected to the third site.

37 Claims, 5 Drawing Sheets

U.S. PATENT DOCUMENTS

2007/0038755 A1* 2/2007 Sullivan et al. ............... 709/226
2007/0171911 A1* 7/2007 Ku ............................... 370/392
2007/0250627 A1* 10/2007 May et al. ..................... 709/225

OTHER PUBLICATIONS

"Configuring Persistence, Remapping, and Redirection on the CSS 11000 and CSS 11500", Cisco Systems, Inc. Document ID # 12646, Mar. 31, 2005, 5 pages.

Cisco AVS 3110 Application Velocity System, Cisco Systems, Inc., 2 pages, 1992-2006 Cisco Systems.

"Frequently Asked Questions and Troubleshooting", Cisco Application Velocity System User Guide, Cisco Systems, Inc., 8 pages.

"Building MPLS-Based Virtual Private Networks and Services for Service Provider Core Networks", 8 pages, 2001 Cisco Systems, Inc.,.

Johna Till Johnson, "MPLS-based services can help data centers: How MPLS applies to data centers", Network World, May 2005, 5 pages.

"Internet Connectivity Options", White Paper, 1992-2002 Cisco Systems, Inc., 24 pages.

* cited by examiner

TECHNIQUES FOR REMAPPING CONTENT REQUESTS

BACKGROUND OF THE INVENTION

Embodiments of the present invention generally relate to networking and more specifically to redirecting content requests.

A user may send a request for content. Typically, the request is routed to a first data center. A content server in the first data center then decides where to route the request. For example, a content server may decide to redirect the request to a second data center. This may be because the other data center may be closer to the user, servers for the first data center may be overloaded or down, etc. Thereafter, future requests for the same content are still sent to the first data center, which then redirects the request to the second data center. Thus, the path for the request always goes through the first data center. This is inefficient and follows a circuitous path. Thus, resources and bandwidth are inefficiently used.

DETAILED DESCRIPTION OF EMBODIMENTS OF THE INVENTION

Embodiments of the present invention provide techniques for routing content requests. In one embodiment, a network device sends a request from a first device at a first site for content to a second device at a second site. The second device determines if the request should be redirected to a third device in a third site. For example, a content server in the second site may decide that a request is better serviced by a third site. This may be because the third site may be closer to the first site, the second site may be overloaded or down, etc. If the request should be redirected, the second device determines a rule for sending further requests for the content to the third site. Signaling is then sent to the network device such that the rule may be installed where further requests for the content are sent to the third site. The further requests are sent to the third site without going through the second site. Accordingly, the requests are more efficiently routed to the third site instead of having to go through the second site and then redirected to the third site.

Figure 1:
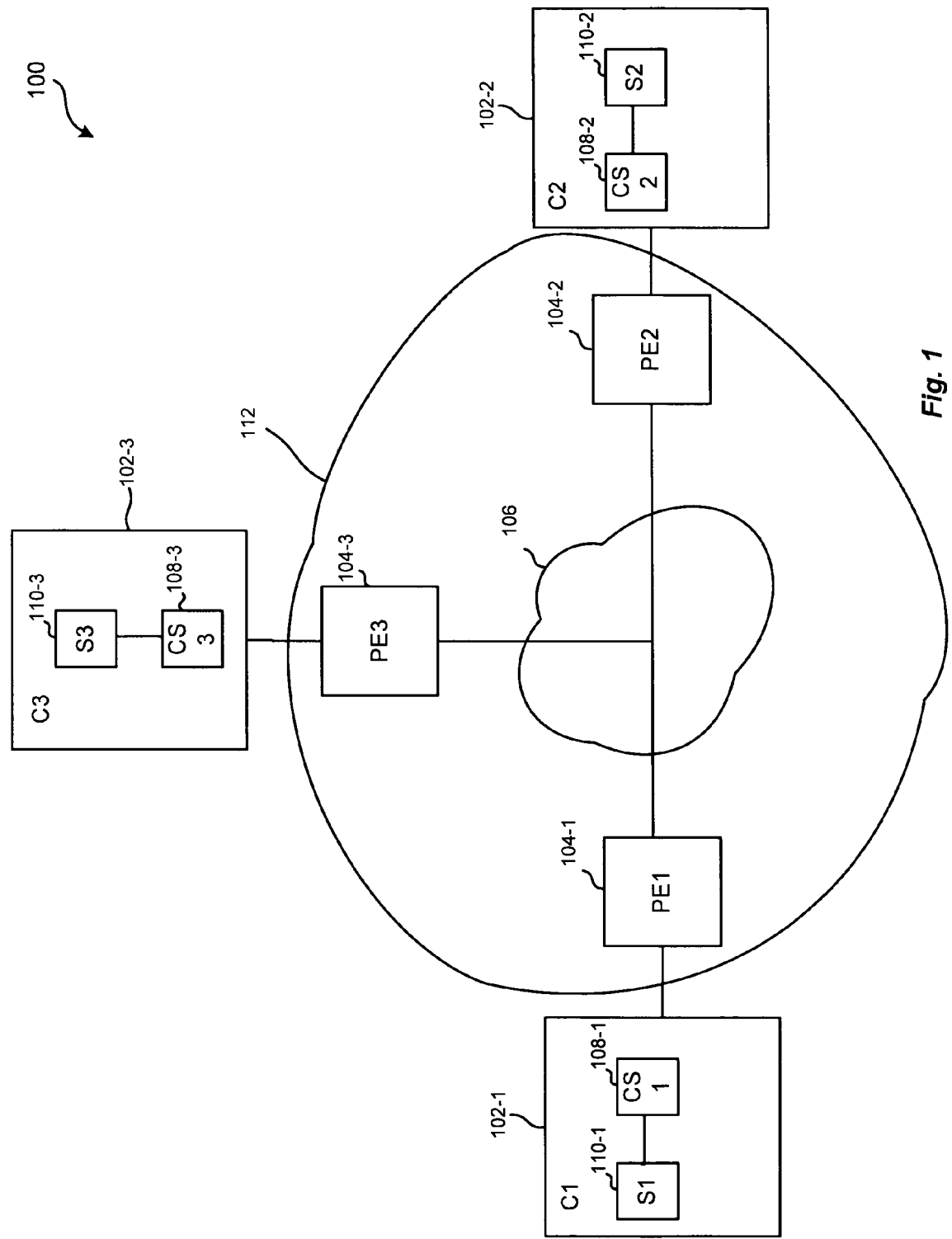
FIG. 1 depicts a simplified system for providing remapping of requests according to one embodiment of the present invention.

FIG. 1 depicts a simplified system 100 for providing remapping of requests according to one embodiment of the present invention. As shown, a first site (C1) 102-1, a second site (C2) 102-2, and a third site (C3) 102-3 are provided. Also, routers (PE1) 104-1, (PE2) 104-2, and (PE3) 104-3 are attached to each site 102, respectively. Each site 102 is connected through a network 112, which may be operated by a service provider. Also, other networks 106 operated by other entities may be in between routers 104, but that is not necessary.

Sites 102 may be remote from each other. Also, sites 102 may be associated with one or more enterprise customers. For example, sites 102 may be associated with a single customer, two different customers, and/or three or more different customers. Each site 102 may include a data center that is used to distribute content. The data center may include a number of servers and other devices that are known in the art, which are used to distribute content. Sites 102 may all be data centers. However, for the purposes of discussion, site 102-1 is considered a client only, and sites 102-2 and 102-3 are considered content providers. For example, site 102 may contain a browser on a computing device that is used to access content in sites 102-2 and/or 102-3.

Each site 102 may include a content switch (CS) 108 and one or more content servers (S) 110. Although a single instance of content switch 108 and servers 110 are shown, it will be understood that any number may be provided in sites 102. Content switch 108 may be any device configured to process content requests. For example, content switch 108 may be a Cisco Content Services Switch (CSS), Cisco Content Switching Module (CSM), Cisco Application Content Engine, etc.

Routers 104 are each attached to sites 102. In one embodiment, routers 104 may be provider edge (PE) routers. These routers may be on the edge of network 106 and are configured to route signaling and data for each site 102. In one embodiment, routers 104 are in the service provider domain. Routers 104 may be controlled by a single service provider. In other embodiments, multiple service providers may be controlling routers 104.

Routers 104 may not be under the direct control of the enterprise customer (the customer associated with sites 102), unlike those devices in the C1/C2/C3 domains. Thus, because the customer does not own routers 104, they cannot program routers 104 themselves. However, content switch 108 can be used to program routers 104 with rules according to embodiments of the present invention. Thus, sites C1/C2/C3 may be controlled by three separate entities, and the service provider is providing a redirect service to C2

In one embodiment, sites 102 are interconnected through network 106 in a virtual private network (VPN). For example, a multi-protocol label switching (MPLS) VPN connects the three sites 102 in a full mesh. That is, there is a path, such as a labeled switch path (LSP), between router 104-1 and router 104-2, router 104-2 and router 104-3, and 104-1 and router 104-3. Also, the core network of the service provider may be LSP based. The VPN specific virtual routing and forwarding (VRF) table routes and forwarding equivalence class (FEC) designations on the label switch router (LSR) may be enhanced and modified for the redirect.

In one embodiment, if a user in site 102-1 would like to access content, a request is sent. A determination is made as to which data center will be the main data center to process the request. This may be determined by known processes. For example, it may be determined that a data center in site 102-2 should be the main data center. Accordingly, the request is routed to router 102-2. Content switch 108-2 services the request and determines a server to service the request. The server selected may be in any of sites 102. In one embodiment, assuming a server in site 102-3 is chosen, the request is redirected to server 110-3. This choice may be determined for many reasons, such as site 102-3 is closer to the user, server 110-2 is down, site 102-2 is overloaded, or any other reason.

Content switch 108 maps the connection to server 110-3. The request is then routed from router 104-2 to router 104-3. Conventionally, even though site 102-3 is selected to service the request, the user's client will still send requests to site 102-2. This may be because a virtual IP (VIP) is still used by the client to connect to site 102-2. This routing includes extra hops that may be unnecessary.

Accordingly, embodiments of the present invention provide installation of a rule in router 104-1 that sends subsequent packets for the same session to site 102-3 without going through router 104-2 and site 102-2. For example, a path may be from site 102-1→router 104-1→router 104-3→site 102-3. This is different from routing packets from site 102-1→router 104-1→router 104-2→site 102-2→router 104-3→site 102-3.

In one embodiment, content switch (CS2) 108-2 determines a rule that may be used to send the subsequent packets to site 102-3. In one embodiment, a flow specification, such as a 5-tuple flow look-up, may be determined. The 5-tuple may include the source IP address, destination IP address, IP protocol, source TCP/UDP port, and destination TCP/UDP port. It will be recognized that other flow specifications may be used. Any information can be used to generate a rule that routes packets to site 102-3. For example, the rule may also specify less specific redirects based only on source IP address. This would redirect all messages from an IP address to site 102-3. Or it may specify more specific redirects based upon data in the IP/TCP/UDP payload.

Information for the flow specification is signaled back to router 104-1. Router 104-1 may then install the rule. When subsequent packets are received, they may be compared to the installed rule. If the packets match the rule (e.g., information in a header information in a packet matches the 5-tuple), it is routed according to the route specified in the rule. For example, the rule may match a FEC and specify a label switched path (LSP) to follow. In this case, the LSP may be from router 104-1 to router 104-3 to site 102-3. In one embodiment, packet is label switched on the LSP as is known in the art.

In one example, the flow look-up may be implemented through access control list functionality. The 5-tuple look-up may require a 128-bit ternary content addressable memory (TCAM) look-up. The output may be a 32-bit label that is assigned to the LSP. Accordingly, any packets matching the 5-tuple will use the LSP that is generated.

Other packets that do not match the 5-tuple may follow the original VIP or normal routing path. In this case, the packets not matching the 5-tuple will be routed to site 102-2 through router 104-2. Thus, these packets will get the label associated with the LSP going to site 102-2.

In another embodiment, router 104-1 may be programmed to do a network address translation (NAT) or port address translation (PAT) on those frames that match the rule. For example, the IP address and TCP/UDP port may be correctly switched to be a destination server address and port in site 102-3. This would normally be done at content switch 108-1, but, for the redirect to work correctly on router 104-1, it also is done on router 104-1.

In another embodiment, if no NAT/PAT is specified, a multi-homed VIP could be used, where the same VIP is housed in both content switch 108-2 in site 102-2 and content switch 108-3 in site 102-3. The normal route tables would have site 102-2 as the next hop for the VIP from site 102-1 and packets destined for the VIP would be sent to site 102-2 and processed by content switch 108-2. However, because it is dual-homed, any packets destined for the VIP, received by site 102-3 could also be processed by content switch 108-3. It then becomes the decision of router 104-1 as to which router 104-2 or 104-3 to forward the packet. By default router 104-2 would be chosen; however, the rule could dictate that router 104-3 is chosen, and no NAT/PAT would be required.

Figure 2:
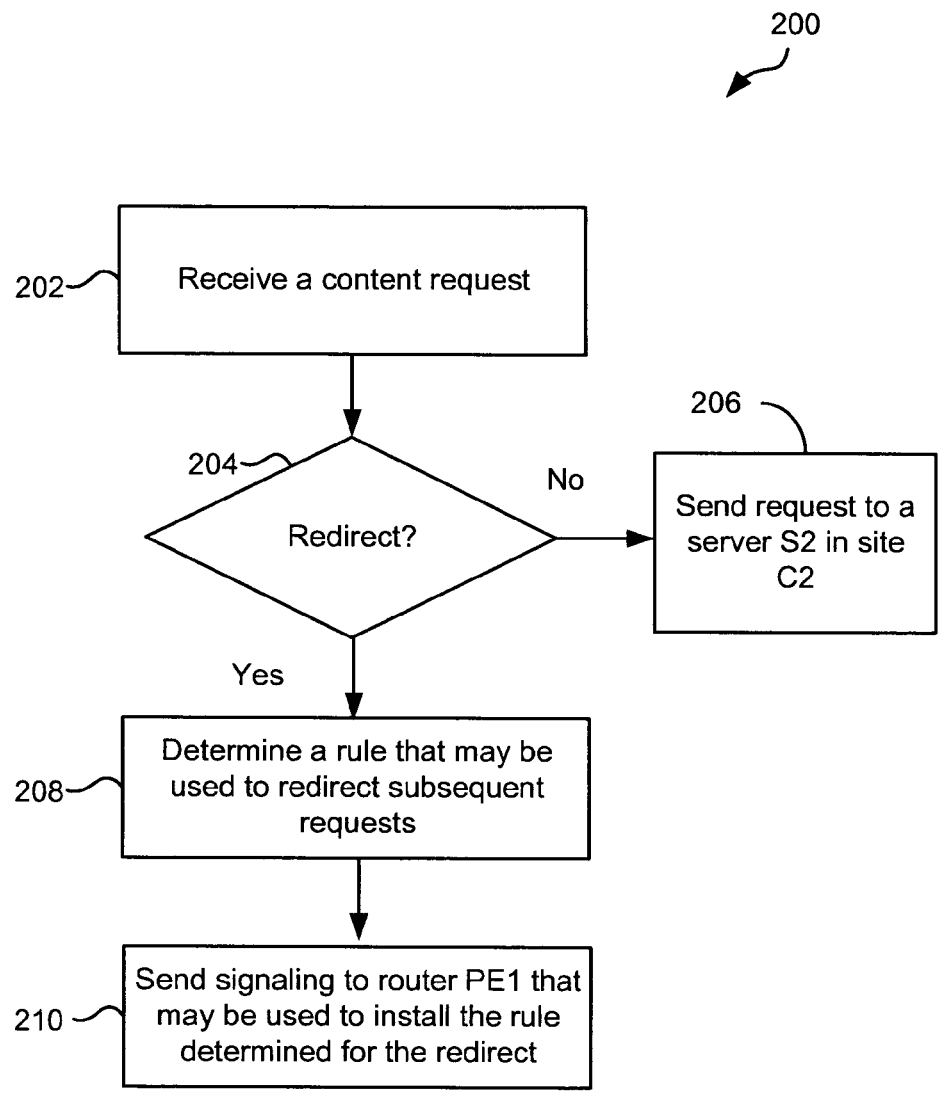
FIG. 2 depicts a simplified flow chart of a method for remapping requests according to one embodiment of the present invention.

FIG. 2 depicts a simplified flow chart 200 of a method for remapping requests according to one embodiment of the present invention. Step 202 receives a content request. The content request may be received from a first site 102-1 at a second site 102-2. The request may be any message requesting content.

Content switch 108-2 may determine whether to redirect the request in step 204. If it is determined that the request should not be redirected, in step 206, the request may be sent to a server 110-2 in site 102-2.

In step 208, if the request should be redirected, content switch 108-2 determines a rule that may be used to redirect subsequent requests.

In step 210, content switch 108-2 sends signaling to router 104-1 that may be used to install the rule determined for the redirect. Also, the packets for the request currently received are forwarded to site 102-3.

Figure 3:
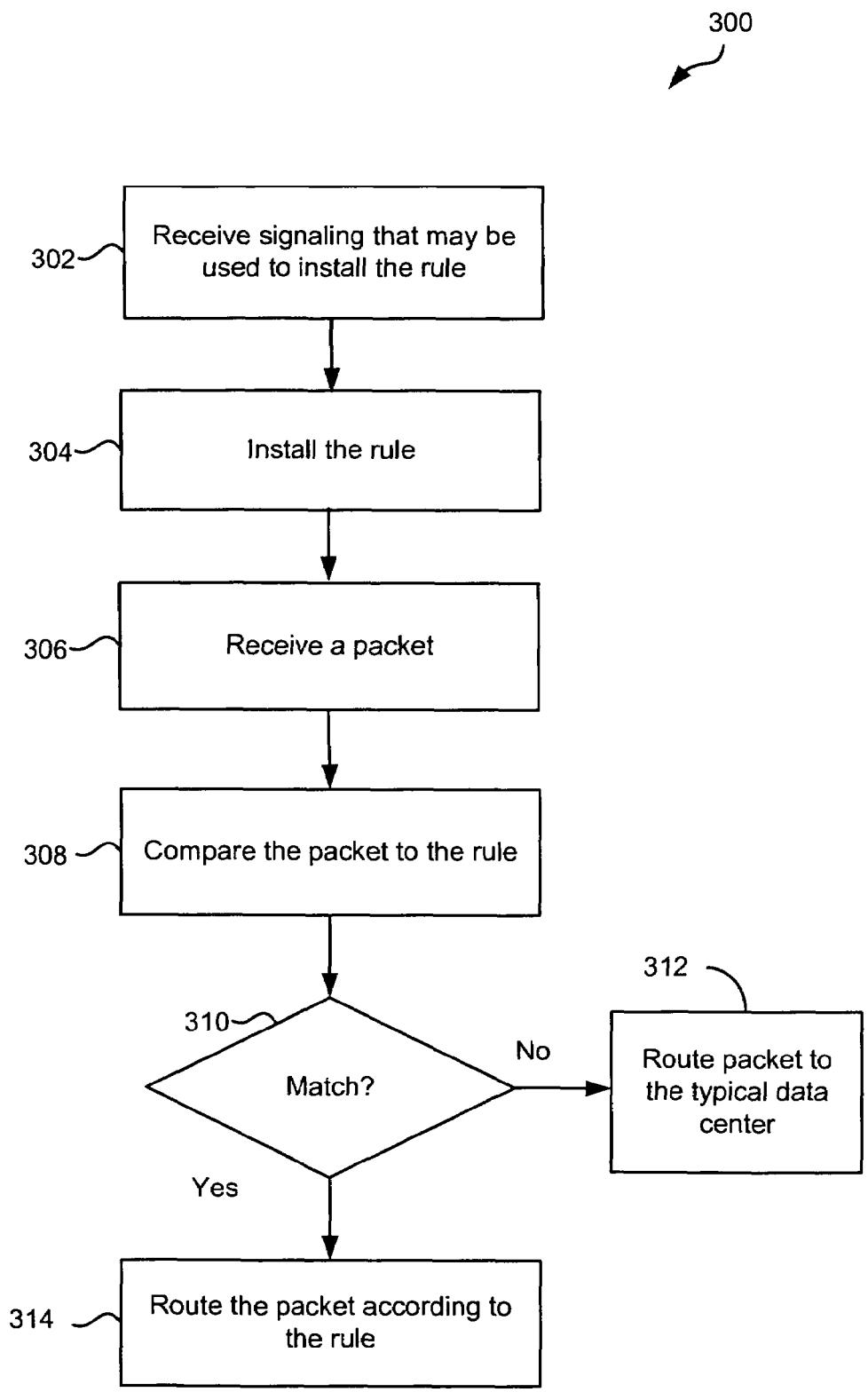
FIG. 3 depicts a simplified flow chart of a method for installing a rule and redirecting requests according to one embodiment of the present invention.

FIG. 3 depicts a simplified flow chart 300 of a method for installing a rule and redirecting requests according to one embodiment of the present invention. In step 302, router 104-1 receives signaling that may be used to install the rule. In one embodiment, the signaling may include information for the rule. For example, the rule itself may be included or information on how to change an existing rule may be provided. The process of reusing already-installed rules will be described in more detail below.

In step 304, router 104-1 installs the rule. For example, a 5-tuple to route or LSP mapping may be installed.

In step 306, router 104-1 receives a packet. The packet may be any message from a client. For example, packets for a request from a user's client may be received. Also, other discrete units of information may be appreciated, such as frames of data, etc.

In step 308, router 104-1 compares the packet to the rule. For example, information in a header for a packet is compared to the 5-tuple to determine if the request matches the rule. In one embodiment, if the packet is for the same session as the initial content request, then it may match the rule. In this case, the information in the packet matches the 5-tuple.

In step 310, if the packet does not match the rule, then the packet is routed to the typical data center, such as site 102-2.

In step 312, if the packet does match the rule, the packet is routed according to the rule. For example, a LSP is determined that is used to route the packet. In one case, the packet is routed to site 102-3 without going through site 102-2.

Figure 4:
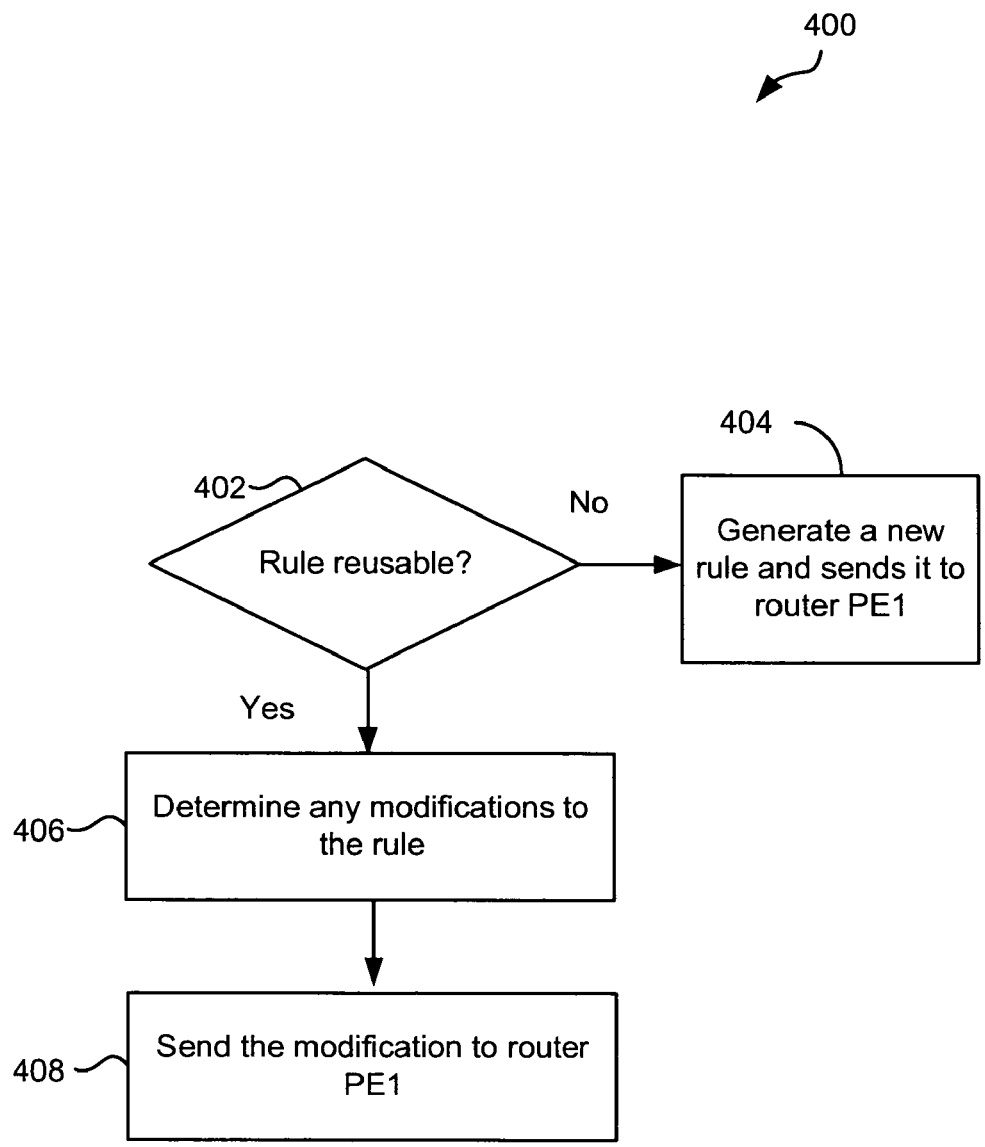
FIG. 4 depicts a simplified flow chart for reusing a rule according to one embodiment of the present invention.

As mentioned above, a rule may be reused instead of installing a new one. FIG. 4 depicts a simplified flow chart 400 for reusing a rule according to one embodiment of the present invention. Step 402 determines if a rule installed on router 104-1 can be reused. For example, content switch 108-2 may keep track of which rules it has installed on router 104-1. If certain information in the rule may be changed instead of sending a new rule, then the rule may be modified. In one example, rules may expire, and are not used by router 102-1. For example, after a rule is idle for a certain period of time, the rule would expire. Content switch 108-2 is configured to determine if any rules have expired or are idle such that it can be reused. By using expired rules, a rule that is active is not modified to a different rule.

If the rule cannot be reused, then step 404 generates a new rule and sends it to router 104-1.

If a rule can be reused, step 406 determines any modifications to the rule. For example, information in the 5tuple may be changed, such as a port number. In one example, the source TCP port may be different; however, the destination TCP port may stay the same. This may be the modification to the rule.

Step 408 then sends the modification to router 104-1. For example, content switch 108-2 may just signal that the source TCP port should be changed in an existing rule. In one embodiment, the option to reuse may be provided. Thus, router 104-1 may decide to reuse or may create a new rule from the changes. In this case, router 104-1 may keep track of idle times, rather than or in addition to content switch 108-2.

Accordingly, this saves signaling that needs to be sent to install a rule. Information for the whole rule may not need to be signaled. Also, an old rule does not need to be deleted and a new rule installed saving processing and memory management costs.

Figure 5:
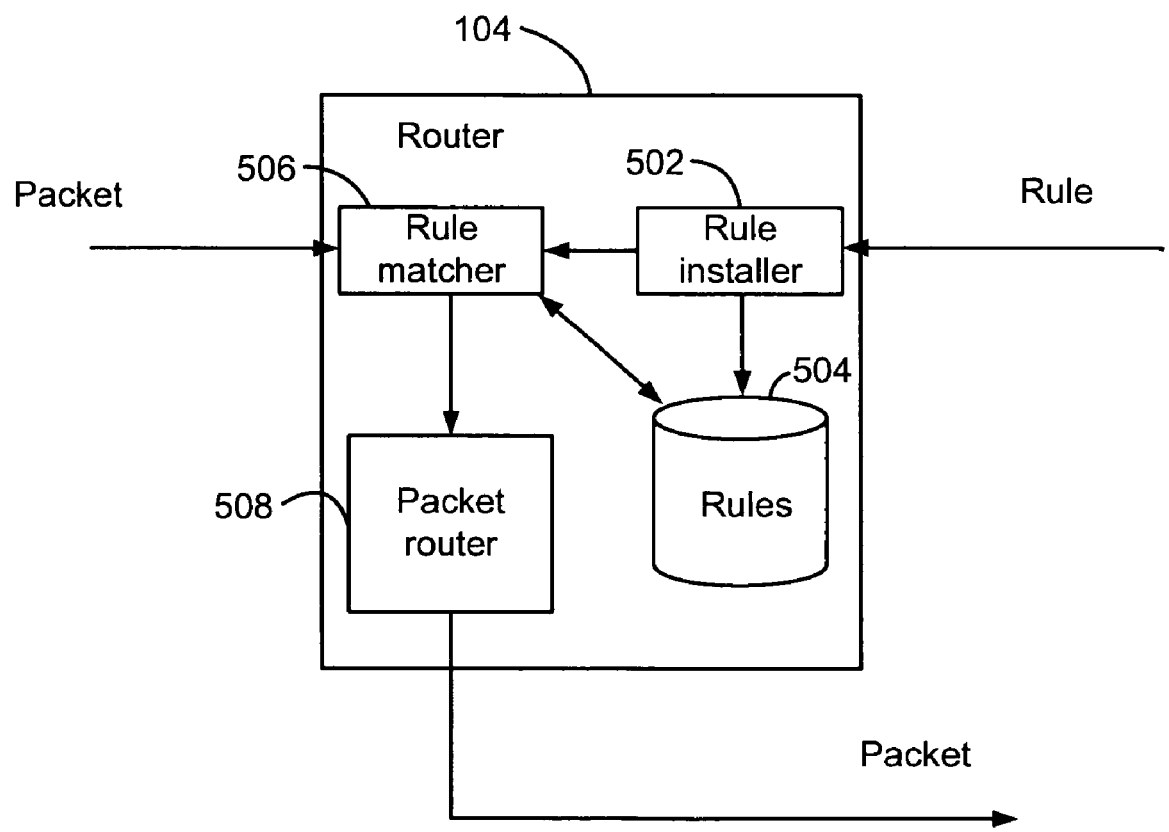
FIG. 5 depicts an embodiment of router 104 according to embodiments of the present invention.

FIG. 5 depicts an embodiment of router 104 according to embodiments of the present invention. As shown, router 104 includes a rule installer 502, rule storage 504, a rule matcher 506, and a packet router 508.

Rule installer 502 receives a rule from content switch 108. The rule may then be installed. For example, the rule is stored in storage 504. Storage 504 may be any storage, such as content addressable memory (CAM), a database, etc.

When a packet is received at router 104, rule matcher 506 determines if the packet matches a rule in rule storage 504. For example, any of the methods described above may be used to determine if the packet matches a rule. Rule matcher 506 sends the result as to whether the packet matched the rule to packet router 508.

Packet matcher 508 is configured to route the packet. In one case, if the packet matches a rule, packet matcher 508 used the rule to route the packet. For example, the packet is redirected. If the packet does not match the rule, the packet is not redirected.

An example using embodiments of the present invention will now be described. A user may use a client to send a request to a website, such as www.website.com. The request goes to a data center in site 102-2. A content switch 108-2 may then determine if the request should be redirected. For example, the request may be redirected to a data center that is closer to the user, such as a data center in site 102-3. When packets for the same session are received, as determined by the 5-tuple match, they are routed to data center 102-3.

Embodiments of the present invention provide many advantages. For example, using the remapping, network bandwidth use, response latency, content switch reuse, and path complexity are optimized. Responses may be quicker because they do have to be routed through extra sites 102. Further, resources of content switch 108 are not used as requests are not unnecessarily sent to additional content switches and the path for routing requests is less complex.

Although the invention has been described with respect to specific embodiments thereof, these embodiments are merely illustrative, and not restrictive of the invention. For example, the remapping may be used with systems other than a data center.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method for redirecting requests, the method comprising:

receiving a request for content at a second device in a second site, the request received from a first device at a first site through a network device;

determining a site in a plurality of sites and a device in a plurality of devices at the site to service the request and further requests for content from the first device, wherein a third device in a third site is determined;

determining, by the second device, a rule including information indicating that further requests for the content are to be sent to the third device in the third site;

determining if the network device includes a reusable rule; and responsive to determining that the network device includes a reusable rule:

determining changes to the reusable rule such that the reusable rule matches the rule, and sending the changes to the network device allowing the network device to change the reusable rule with the changes, such that further requests for the content are sent to the third device in the third site without going through the second site when the further requests satisfy the changed reusable rule.

2. The method of claim 1, further comprising determining a path using the rule, the path configured to direct the request to the third site without going through the second site.

3. The method of claim 2, wherein the path comprises a label switched path.

4. The method of claim 1, wherein the rule comprises a 5-tuple.

5. The method of claim 1, further comprising:

responsive to a determination that the network device does not include a reusable rule:

sending signaling for the rule to the network device, wherein the rule is installed such that further requests for the content are sent to the third device in the third site without going through the second site when the further requests satisfy the rule.

6. The method of claim 1, wherein determining if the network device includes a reusable rule further comprises:

determining if the network device includes a rule that is not in use.

7. The method of claim 1, the network device comprises a router, the first device comprises a client, the second device comprises a first content switch, and the third device comprises a second content switch.

8. The method of claim 1, wherein the first site, second site, and third site each comprise separate data centers.

9. The method of claim 1, wherein the further requests comprise a packet that includes information that satisfies the rule.

10. A method for redirecting requests, the method comprising:

sending, at a network device, a first request for content received from a first device at a first site to a second device in a second site;

receiving, from the second device in the second site, a rule for sending further requests for the content to a third site, the third site determined by the second device as a site to service the request and further requests for content from the first device;

determining if the rule includes changes for a reusable rule already installed at the network device;

responsive to determining that the rule includes changes for a reusable rule already installed at the network device:

determining changes to the reusable rule such that the reusable rule matches the rule, and changing the reusable rule at the network device using the changes in the rule;

receiving a second request for the content;

determining if the second request matches the rule; and
responsive to determining that the second request matches the rule:
sending the second request for the content to the third site based on the rule without going through the second site.

11. The method of claim 10, further comprising determining a path using the rule, the path directing the request to the third site without going through the second site.

12. The method of claim 11, wherein the path comprises a label switched path.

13. The method of claim 10, further comprising:
responsive to determining that the rule does not include changes for a reusable rule already installed at the network device:
installing the rule at the network device.

14. The method of claim 10, wherein determining if the rule includes changes for a reusable rule already installed at the network device further comprises:
determining if the network device includes a rule that is not in use.

15. The method of claim 10, wherein the network device comprises a router, the first device comprises a client, the second device comprises a first content switch, and the third device comprises a second content switch.

16. The method of claim 10, wherein the first site, second site, and third site each comprise separate data centers.

17. The method of claim 10, if the second request does not match the rule, sending the second request for the content to the second site.

18. The method of claim 10, wherein the second request comprises a packet that includes information that satisfies the rule.

19. An apparatus configured to facilitate redirecting of requests, the apparatus comprising:
one or more computer processors; and
a memory containing instructions that, when executed by the one or more computer processors, cause the one or more computer processors to perform a set of steps comprising:
receiving a request for content at the apparatus in a second site, the request received from a first device at a first site through a network device;
determining a site in a plurality of sites and a device in a plurality of devices at the site to service the request and further requests for content from the first device, wherein a third device in a third site is determined;
determining, by the one or more computer processors, a rule including information indicating that further requests for the content are to be sent to the third device in the third site;
determining if the network device includes a reusable rule; and
responsive to determining that the network device includes a reusable rule:
determining changes to the reusable rule such that the reusable rule matches the rule, and
sending the changes to the network device allowing the network device to change the reusable rule with the changes, such that further requests for the content are sent to the third device in the third site without going through the second site when the further requests satisfy the changed reusable rule.

20. The apparatus of claim 19, wherein the instructions cause the one or more computer processors to perform a further step comprising:
determining a path using the rule, the path configured to direct the request to the third site without going through the second site.

21. The apparatus of claim 19, further comprising:
responsive to determining that the rule does not include changes for a reusable rule already installed at the network device:
installing the rule at the network device.

22. The apparatus of claim 19, wherein determining if the rule includes changes for a reusable rule already installed at the network device further comprises:
determining if the network device includes a rule that is not in use.

23. The apparatus of claim 22, wherein the rule is determined to be reusable when it is not in use.

24. The apparatus of claim 19, wherein the network device comprises a router, the first device comprises a client, the apparatus comprises a first content switch, and the third device comprises a second content switch.

25. The apparatus of claim 19, wherein the first site, second site, and third site each comprise separate data centers.

26. The apparatus of claim 19, wherein the further requests comprise a packet that includes information that satisfies the rule.

27. A network device configured to facilitate the redirecting of requests, the network device comprising:
one or more computer processors; and
a memory containing instructions that, when executed by the one or more computer processors, cause the one or more computer processors to perform a set of steps comprising:
sending, by the network device, a first request for content received from a first device at a first site to a second device in a second site;
receiving, from the second device in the second site, a rule for sending further requests for the content to a third site, the third site determined by the second device as a site to service the request and further requests for content from the first device;
determining if the rule includes changes for a reusable rule already installed at the network device;
responsive to determining that the rule includes changes for a reusable rule already installed at the network device:
determining changes to the reusable rule such that the reusable rule matches the rule, and
changing the reusable rule at the network device using the changes in the rule;
receiving a second request for the content;
determining if the second request matches the rule; and
responsive to determining that the second request matches the rule:
sending the second request for the content to the third site based on the rule without going through the second site.

28. The network device of claim 27, wherein the instructions cause the one or more computer processors to perform a further step comprising:
determining a path using the rule, the path directing the request to the third site without going through the second site.

29. The network device of claim 28, wherein the path comprises a label switched path.

30. The network device of claim 27, wherein the instructions cause the one or more computer processors to perform further steps comprising:

responsive to determining that the rule does not include changes for a reusable rule already installed at the network device:
  installing the rule at the network device.

31. The network device of claim 27, wherein determining if the rule includes changes for a reusable rule already installed at the network device further comprises:
  determining if the network device includes a rule that is not in use.

32. The network device of claim 27, wherein the apparatus comprises a router, the first device comprises a client, the second device comprises a first content switch, and the third device comprises a second content switch.

33. The network device of claim 27, wherein the first site, second site, and third site each comprise separate data centers.

34. The network device of claim 27, if the second request does not match the rule, wherein the instructions cause the one or more computer processors to send the second request for the content to the second site.

35. The network device of claim 27, wherein the second request comprises a packet that includes information that satisfies the rule.

36. An apparatus configured to redirect requests, the apparatus comprising:
  means for receiving a request for content at the apparatus in a second site, the request received from a first device at a first site through a network device;
  means for determining a site in a plurality of sites and a device in a plurality of devices at the site to service the request and further requests for content from the first device, wherein a third device in a third site is determined;
  means for determining, by the apparatus, a rule including information indicating that further requests for the content are to be sent to the third device in the third site;
  means for determining if the network device includes a reusable rule; and
  means for, responsive to determining that the network device includes a reusable rule:
    determining changes to the reusable rule such that the reusable rule matches the rule, and
    sending the changes to the network device allowing the network device to change the reusable rule with the changes, such that further requests for the content are sent to the third device in the third site without going through the second site when the further requests satisfy the changed reusable rule.

37. A network device configured to redirect requests, the network device comprising:
  means for sending, by the network device, a first request for content received from a first device at a first site to a second device in a second site;
  means for receiving, from the second device in the second site, a rule for sending further requests for the content to a third site, the third site determined by the second device as a site to service the request and further requests for content from the first device;
  means determining if the rule includes changes for a reusable rule already installed at the network device;
  responsive to determining that the rule includes changes for a reusable rule already installed at the network device:
    determining changes to the reusable rule such that the reusable rule matches the rule, and
    changing the reusable rule at the network device using the changes in the rule;
  means for receiving a second request for the content;
  means for determining if the second request matches the rule; and
  means for, responsive to determining that the second request matches the rule, sending the second request for the content to the third site based on the rule without going through the second site.

* * * * *